United States Patent Office 2,971,004
Patented Feb. 7, 1961

2,971,004
SUBSTITUTED CYCLOSERINES

Edward B. Hodge, Terre Haute, Ind., assignor to Commercial Solvents Corporation, New York, N.Y., a corporation of Maryland No Drawing. Filed Apr. 7, 1959, Ser. No. 804,576

8 Claims. (Cl. 260—307)

My invention relates to substituted cycloserines having the general formula:

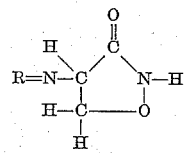

where R is either the cyclohexylidine radical or the radical

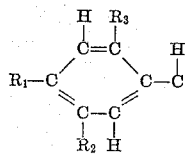

where $R_1$ is either Cl, $CH_3O$— or H; $R_2$ is $CH_3O$— or H; and $R_3$ is either Cl or H; and to a method for producing same.

Cycloserine, an antibiotic, active against many gram positive and gram negative bacteria, is described in U.S. Patent No. 2,773,887. It is an amphoteric substance which is used medically in the free base form. While cycloserine in the free base form is a useful antibiotic, it does not remain stable when stored for an extended period of time. The free base being highly hygroscopic, rapidly loses its antibiotic potency in the presence of moisture.

I have now discovered new substituted cycloserine compounds designated by the formula:

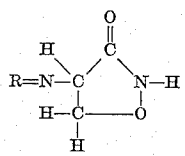

where R is either the cyclohexylidine radical or the radical

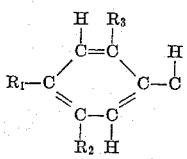

where $R_1$ is either Cl, $CH_3O$— or H; $R_2$ is $CH_3O$— or H; and $R_3$ is either Cl or H; which possess the antibiotic properties of cycloserine and which possess the important advantageous properties of remaining stable at usual storage temperatures in the presence of substantial amounts of moisture over an extended period of time. My new compounds possess the therapeutic utility of ordinary cycloserine free base and also act as hypnotic agents.

The new compounds of my invention can be prepared by reacting cycloserine with either cyclohexanone or an aldehyde having the following general formula:

$$\begin{array}{c}\text{H} \quad R_3 \\ | \quad | \\ C{=}C \quad H \\ R_1{-}C \diagup \quad \diagdown C{-}C{=}O \\ \diagdown \quad \diagup \\ C{-}C \\ | \quad | \\ R_2 \quad H\end{array}$$

where $R_1$ is either $CH_3O$—, Cl or H; $R_2$ is either $CH_3O$— or H; and $R_3$ is either Cl or H.

The reaction is carried out in a solvent inert to the reactants and reaction products at temperatures ranging from 25–100° C. However, I prefer temperatures of from about 35–45° C. Examples of suitable inert solvents include the lower aliphatic alcohols having up to four carbon atoms.

Cycloserine and cyclohexanone or an aldehyde having the following general formula:

$$\begin{array}{c}\text{H} \quad R_3 \\ | \quad | \\ C{=}C \quad H \\ R_1{-}C \diagup \quad \diagdown C{-}C{=}O \\ \diagdown \quad \diagup \\ C{-}C \\ | \quad | \\ R_2 \quad H\end{array}$$

where $R_1$ is either $CH_3O$—, Cl or H; $R_2$ is either $CH_3O$— or H; and $R_3$ is either Cl or H, are added to an inert solvent such as methanol and the resulting mixture is stirred at atmospheric pressure and at approximately 40° C. to produce my new compounds. My new compounds may be recovered by filtering the reaction mixture, concentrating and then filtering the filtrate.

The following examples are offered to illustrate my invention and it is to be understood that I do not intend to be limited to the exact amounts and procedures set forth therein.

EXAMPLE I

To 600 ml. of methanol was added 20 grams of cycloserine and 40 ml. of cyclohexanone. The resulting mixture was stirred for 40 minutes while being heated to 40° C. at atmospheric pressure. The reaction mixture was then filtered and the filtrate was concentrated at reduced pressures to 175 mls. and then the filtrate was refrigerated at about 10° C. for 3 hours. The filtrate was then filtered to give 17 grams of the reaction product, cyclohexylidine cycloserine (48% yield). The cyclohexylidine cycloserine had a melting point of 205° C.

EXAMPLE II

N-(3,4-dimethoxybenzylidine)cycloserine was produced by the method of Example I, except that 3,4-dimethoxybenzaldehyde was employed as the starting material instead of cyclohexanone. N-(3,4-dimethoxybenzylidine)-cycloserine had a melting point of 145–147° C.

EXAMPLE III

N-(2,4-dichlorobenzylidine)cycloserine was produced by the method of Example I, except that 2,4-dichlorobenzaldehyde was employed as the starting material rather than cyclohexanone. The N-(2,4-dichlorobenzylidine)cycloserine had a melting point of 138–140° C.

All the compounds set out in the examples show antibacterial activity. The antibacterial activity of the new compounds is set out in the table below, which shows the minimum inhibitory concentrations in micrograms per milliliter of the compounds tested against *Staphylococcus aureus*.

Minimum inhibitory concentration against Staphylococcus aureus (μg./ml.)

N-cyclohexylidinecycloserine _____ 200–350
N-(3,4-dimethoxybenzylidine)cycloserine _____ 50–100
N-(2,4-dichlorobenzylidine)cycloserine _____ 75–250

Now having described my invention, what I claim is:
1. Substituted cycloserines having the following general formula:

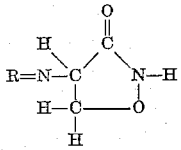

where R is a member selected from the group consisting of the cyclohexylidine radical and the radical

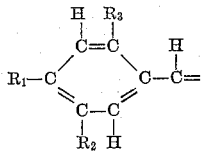

where $R_1$ is a member selected from the group consisting of $CH_3O-$, Cl and H; $R_2$ is a member selected from the group consisting of $CH_3O-$ and H; and $R_3$ is a member selected from the group consisting of Cl and H.

2. N-cyclohexylidinecycloserine.
3. N-(3,4-dimethoxybenzylidine)cycloserine.
4. N-(2,4-dichlorobenzylidine)cycloserine.
5. In a process for the preparation of substituted cycloserines having the general formula:

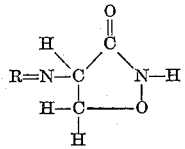

where R is a member selected from the group consisting of the cyclohexylidine radical and the radical

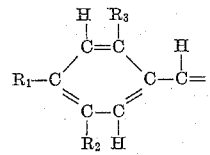

where $R_1$ is a member selected from the group consisting of $CH_3O-$, Cl and H; $R_2$ is a member selected from the group consisting of $CH_3O-$ and H; and $R_3$ is a member selected from the group consisting of Cl and H; the step which comprises reacting cycloserine with a carbonyl compound selected from the group consisting of cyclohexanone and aldehydes having the general formula:

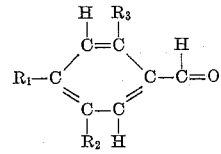

where $R_1$ is a member selected from the group consisting of $CH_3O-$, Cl and H; $R_2$ is a member selected from the group consisting of $CH_3O-$ and H; and $R_3$ is a member selected from the group consisting of Cl and H; at temperatures ranging from 25–100° C.

6. The process of claim 5 wherein the temperature is 40° C. and the aldehyde is 3,4-dimethoxybenzaldehyde.
7. The process of claim 5 wherein the temperature is 40° C. and the aldehyde is 2,4-dichlorobenzaldehyde.
8. The process of claim 5 wherein the reaction is carried out in the solvent inert to the reactants and the reaction product.

References Cited in the file of this patent
UNITED STATES PATENTS 2,840,565   Holley et al. _____ June 24, 1958

FOREIGN PATENTS 1,076,994   France _____ Apr. 28, 1954
722,679     Great Britain _____ Jan. 26, 1955